US011948242B2

(12) United States Patent
Schouela et al.

(10) Patent No.: US 11,948,242 B2
(45) Date of Patent: *Apr. 2, 2024

(54) INTELLIGENT SMOOTHING OF 3D ALTERNATIVE REALITY APPLICATIONS FOR SECONDARY 2D VIEWING

(71) Applicant: FMR LLC, Boston, MA (US)

(72) Inventors: Adam Schouela, Needham, MA (US); David Martin, Natick, MA (US); Brian Lough, County Galway (IE); James Andersen, Cary, NC (US); Cecelia Brooks, West Townsend, MA (US)

(73) Assignee: FMR LLC, Boston, MA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/459,540

(22) Filed: Aug. 27, 2021

(65) Prior Publication Data
US 2021/0390766 A1    Dec. 16, 2021

Related U.S. Application Data

(63) Continuation-in-part of application No. 16/942,571, filed on Jul. 29, 2020, now Pat. No. 11,138,804.
(Continued)

(51) Int. Cl.
*G06T 15/20* (2011.01)
(52) U.S. Cl.
CPC .................... *G06T 15/20* (2013.01)
(58) Field of Classification Search
CPC ....... G06T 19/006; G06T 19/20; G06T 15/20; G06T 2219/2016; G06T 2219/024; G06T 19/003; G06F 3/1454; G06F 3/04815
See application file for complete search history.

(56) References Cited

U.S. PATENT DOCUMENTS 9,063,330 B2    6/2015 LaValle et al.
9,972,134 B2    5/2018 Mathey-Owens et al.
(Continued)

OTHER PUBLICATIONS

J. Gugenheimer et al., "ShareVR: Enabling Co-Located Experiences for Virtual Reality between HMD and Non-HMD Users," CHI '17: Proceedings of the 2017 CHI Conference on Human Factors in Computing Systems, May 2017, Denver, CO, USA, pp. 4021-4033.

*Primary Examiner* — Chante E Harrison
(74) *Attorney, Agent, or Firm* — Cesari & McKenna, LLP

(57) ABSTRACT

Methods and apparatuses are described for intelligent smoothing of 3D alternative reality applications for secondary 2D viewing. A computing device receives a first data set corresponding to a first position of an alternative reality viewing device. The computing device generates a 3D virtual environment for display on the alternative reality viewing device using the first data set, and a 2D rendering of the virtual environment for display on a display device using the first data set. The computing device receives a second data set corresponding to a second position of the alternative reality viewing device after movement of the alternative reality viewing device. The computing device determines whether a difference between the first data set and the second data set is above a threshold. The computing device updates the 2D rendering of the virtual environment on the display device using the second data set, when the difference is above the threshold value.

24 Claims, 6 Drawing Sheets

Related U.S. Application Data

(60) Provisional application No. 62/882,459, filed on Aug. 2, 2019.

(56) References Cited

U.S. PATENT DOCUMENTS

| | | |
|---|---|---|
| 10,089,790 B2 | 10/2018 | Lawson et al. |
| 10,511,773 B2 | 12/2019 | Karpenko |
| 10,733,783 B2 | 8/2020 | Vlachos et al. |
| 11,625,156 B2 * | 4/2023 | Byrod .................. G01C 21/367 345/427 |
| 2013/0002813 A1 | 1/2013 | Vaught et al. |
| 2017/0105052 A1 | 4/2017 | DeFaria |
| 2017/0155885 A1 | 6/2017 | Selstad et al. |
| 2017/0180800 A1 | 6/2017 | Mayrand |
| 2018/0047332 A1 | 2/2018 | Kuwahara et al. |
| 2018/0075654 A1 | 3/2018 | Vembar et al. |
| 2018/0075820 A1 | 3/2018 | Hicks et al. |
| 2018/0144524 A1 | 5/2018 | Lotto et al. |
| 2018/0367733 A1 | 12/2018 | Sun et al. |
| 2019/0005216 A1 | 1/2019 | Yakishyn et al. |
| 2019/0038964 A1 | 2/2019 | Veeramani et al. |
| 2019/0297304 A1 | 9/2019 | Li |
| 2019/0342632 A1 | 11/2019 | DeFaria et al. |
| 2020/0243026 A1 | 7/2020 | Li et al. |
| 2020/0264701 A1 | 8/2020 | Tokubo et al. |
| 2020/0380783 A1 * | 12/2020 | Byrod .................. G01C 21/367 |

\* cited by examiner

INTELLIGENT SMOOTHING OF 3D ALTERNATIVE REALITY APPLICATIONS FOR SECONDARY 2D VIEWING

RELATED APPLICATION

This application is a continuation-in-part of U.S. patent application Ser. No. 16/942,571, filed Jul. 29, 2020, which claims priority to U.S. Provisional Patent Application No. 62/882,459, filed Aug. 2, 2019, the entirety of each of which is incorporated herein by reference.

TECHNICAL FIELD

This application relates generally to methods and apparatuses, including computer program products, for intelligent smoothing of three-dimensional (3D) alternative reality applications for secondary two-dimensional (2D) viewing.

BACKGROUND

Generally, alternative reality software applications provide for an experience in which a user's real-world viewing perspective is replaced by or enhanced with a virtual 3D environment. In the context of this application, the term "alternative reality" encompasses all different types of virtual experiences, including but not limited to: virtual reality (VR), augmented reality (AR), mixed reality (MR), extended reality (XR) and others. A user wears a headset or similar apparatus that includes specialized display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner. Exemplary headsets comprise the VIVE™ and VIVE Pro™ available from HTC Corporation, the Oculus Rift™ available from Facebook Technologies, LLC, and the Sony Playstation™ VR headset available from Sony Corporation.

In some instances, it may be desirable to display the alternative reality application to others who are not directly using the application via a headset. For example, a developer may want to provide a demonstration of the alternative reality software to an audience of viewers. The developer can display the virtual environment being rendered by the headset to a projector, a monitor or other type of 2D screen. This is called remote viewing or secondary 2D viewing.

However, remote viewing of 3D alternative reality software applications on a 2D screen creates a very jittery experience for the viewers outside the headset. FIG. 1 is a diagram of a system for secondary viewing of an alternative reality application without smoothing. As shown in FIG. 1, a user 102 is wearing an alternative reality headset 103 to view a 3D alternative reality application, and the user's viewpoint of the virtual environment is transmitted for display on display device 104 to an audience of viewers as a 2D rendering 105. Every slight movement of the alternative reality user's head shows as a 1-to-1 movement of a corresponding 2D rendering of the virtual environment 105 on the display device 104 because the alternative reality user 102 wearing the headset 103 may not be thinking about head movement, and even when thinking about head movement, it is quite difficult to eliminate all the jitter. For example, the alternative reality user 102 may be looking at an object in the virtual environment, and his or her eyes are naturally compensating for head movement by staying focused on the 3D object in his or her sight—regardless of how his or her head is moving. A real-world example is a ballerina that is doing a pirouette. The ballerina's body is spinning rapidly in a circle, and her head remains still, only turning after her body has completed at least a portion of the rotation. To compensate for the turning of the head, the ballerina's eyes are focused on an object in the distance. This steadies the movement of her head, thus causing less movement to the inner ear, and thereby reducing dizziness.

Users outside the headset 103 (such as those viewing the 2D display device 104) are not able to compensate for the alternative reality user's head movement in the same way, and thus the 2D rendering of the virtual environment 105 is jittery and can induce unpleasant side effects to the viewer (e.g., nausea, dizziness).

SUMMARY

Therefore, what is needed are methods and systems that can intelligently smooth the alternative reality application as it is being presented on a screen in a secondary 2D viewing session, so that the above-referenced jitter is reduced or eliminated.

The invention, in one aspect, features a system for intelligent smoothing of three-dimensional (3D) alternative reality applications for secondary two-dimensional (2D) viewing. The system includes an alternative reality viewing device that displays a 3D virtual environment to a user of the alternative reality viewing device. The system includes a display device that displays a 2D rendering of the 3D virtual environment to one or more other users. The system includes a computing device coupled to the alternative reality viewing device and the display device. The computing device comprises a memory to store computer-executable instructions and a processor that executes the computer-executable instructions to receive a first data set corresponding to a first position of the alternative reality viewing device. The computing device generates the 3D virtual environment for display on the alternative reality viewing device using the first data set. The computing device generates the 2D rendering of the 3D virtual environment for display on the display device using the first data set. The computing device receives a second data set corresponding to a second position of the alternative reality viewing device after movement of the alternative reality viewing device. The computing device determines whether a difference between the first data set and the second data set is above a threshold value. The computing device updates the 2D rendering of the 3D virtual environment being displayed on the display device using the second data set, when the difference between the first data set and the second data set is above the threshold value. In some embodiments, updating the 2D rendering comprises calculating the difference between the first data set and the second data set, and animating movement in the 2D rendering based upon the calculated difference.

The invention, in another aspect, features a computerized method of intelligent smoothing of three-dimensional (3D) alternative reality applications for secondary two-dimensional (2D) viewing. A computing device receives, from an alternative reality viewing device, a first data set corresponding to a first position of the alternative reality viewing device. The computing device generates a 3D virtual environment for display on the alternative reality viewing device using the first data set. The computing device generates a 2D rendering of the 3D virtual environment for display on a display device using the first data set. The computing device receives a second data set corresponding to a second position of the alternative reality viewing device after movement of the alternative reality viewing device. The computing device determines whether a difference between the first data set and the second data set is above a threshold value. The computing device updates the 2D rendering of the 3D virtual environment being displayed on the display device using the second data set, when the difference between the first data set and the second data set is above the threshold value. In some embodiments, updating the 2D rendering comprises calculating the difference between the first data set and the second data set, and animating movement in the 2D rendering based upon the calculated difference.

Any of the above aspects can include one or more of the following features. In some embodiments, the alternative reality viewing device is a virtual reality (VR) headset. In some embodiments, the first data set and the second data set each comprises degrees-of-freedom (DoF) coordinate data. In some embodiments, the DoF coordinate data corresponds to one or more of: rotational movement of the alternative reality viewing device around x-, y-, and z-axes, or translational movement along the x-, y-, and z-axes.

In some embodiments, determining whether a difference between the first data set and the second data set is above a threshold value comprises: determining a difference between one or more DoF coordinate values in the first data set and one or more corresponding DoF coordinate values in the second data set; and comparing the difference to a threshold value for the corresponding DoF coordinate. In some embodiments, determining whether a difference between the first data set and the second data set is above a threshold value comprises: determining a difference between each of two or more DoF coordinate values in the first data set and each of two or more corresponding DoF coordinate values in the second data set; aggregating the differences between each of the respective two or more DoF coordinate values into an overall difference; and comparing the overall difference to a threshold value.

In some embodiments, updating the 2D rendering, the display device displays a representation of the 3D virtual environment that corresponds to a current viewpoint of the alternative reality viewing device. In some embodiments, during updating of the 2D rendering, the server computing device applies an interpolation routine to the 2D rendering. In some embodiments, applying an interpolation routine to the 2D rendering comprises: determining a distance between a data element in the first data set and a corresponding data element in the second data set; and generating one or more additional frames for insertion into the 2D rendering to transition smoothly between the first position of the alternative reality viewing device and the second position of the alternative reality viewing device.

In some embodiments, the server computing device generates a plurality of 2D renderings of the 3D virtual environment. In some embodiments, each of the plurality of 2D renderings is transmitted for display on a different one of a plurality of display devices. In some embodiments, the server computing device determines the threshold value based upon an application type associated with the 3D virtual environment.

The invention, in another aspect, features a system for intelligent smoothing of three-dimensional (3D) alternative reality applications for secondary two-dimensional (2D) viewing. The system comprises an alternative reality viewing device that displays a 3D virtual environment to a user of the alternative reality viewing device and a display device that displays a 2D rendering of the 3D virtual environment to one or more other users. The system further comprises a computing device coupled to the alternative reality viewing device and the display device, the computing device comprising a memory to store computer-executable instructions and a processor that executes the computer-executable instructions. The computing device receives a first data set corresponding to a first position of the alternative reality viewing device. The computing device generates a second data set corresponding to a first position of a virtual camera in the 3D virtual environment that is different from the first position of the alternative reality viewing device. The computing device generates the 3D virtual environment for display on the alternative reality viewing device using the first data set. The computing device generates the 2D rendering of the 3D virtual environment for display on the display device using the second data set, the 2D rendering comprising a virtual avatar representing the user of the alternative reality viewing device in the 3D virtual environment. The computing device receives a third data set corresponding to a second position of the alternative reality viewing device after movement of the alternative reality viewing device. The computing device determines whether a difference between the first data set and the third data set is above a threshold value. The computing device updates a characteristic of the virtual avatar in the 2D rendering of the 3D virtual environment being displayed on the display device using the third data set, when the difference between the first data set and the third data set is above the threshold value.

The invention, in another aspect, features a computerized method of intelligent smoothing of three-dimensional (3D) alternative reality applications for secondary two-dimensional (2D) viewing. The system comprises an alternative reality viewing device that displays a 3D virtual environment to a user of the alternative reality viewing device and a display device that displays a 2D rendering of the 3D virtual environment to one or more other users. The system further comprises a computing device coupled to the alternative reality viewing device and the display device, the computing device comprising a memory to store computer-executable instructions and a processor that executes the computer-executable instructions. The computing device receives a first data set corresponding to a first position of the alternative reality viewing device. The computing device generates a second data set corresponding to a first position of a virtual camera in the 3D virtual environment that is different from the first position of the alternative reality viewing device. The computing device generates the 3D virtual environment for display on the alternative reality viewing device using the first data set. The computing device generates the 2D rendering of the 3D virtual environment for display on the display device using the second data set, the 2D rendering comprising a virtual avatar representing the user of the alternative reality viewing device in the 3D virtual environment. The computing device receives a third data set corresponding to a second position of the alternative reality viewing device after movement of the alternative reality viewing device. The computing device determines whether a difference between the first data set and the third data set is above a threshold value. The computing device updates a characteristic of the virtual avatar in the 2D rendering of the 3D virtual environment being displayed on the display device using the third data set, when the difference between the first data set and the third data set is above the threshold value.

Any of the above aspects can include one or more of the following features. In some embodiments, the alternative reality viewing device is a virtual reality (VR) headset. In some embodiments, the first data set and the third data set each comprises degrees-of-freedom (DoF) coordinate data. In some embodiments, the DoF coordinate data corresponds to one or more of: rotational movement of the alternative reality viewing device around x-, y-, and z-axes, or translational movement along the x-, y-, and z-axes. In some embodiments, determining whether a difference between the first data set and the third data set is above a threshold value comprises determining a difference between one or more DoF coordinate values in the first data set and one or more corresponding DoF coordinate values in the third data set; and comparing the difference to a threshold value for the corresponding DoF coordinate.

In some embodiments, determining whether a difference between the first data set and the third data set is above a threshold value comprises determining a difference between each of two or more DoF coordinate values in the first data set and each of two or more corresponding DoF coordinate values in the third data set; aggregating the differences between each of the respective two or more DoF coordinate values into an overall difference; and comparing the overall difference to a threshold value. In some embodiments, the computing device receives a fourth data set corresponding to a second position of the virtual camera; and updates the 2D rendering of the 3D virtual environment being displayed on the display device using the fourth data set. In some embodiments, the second data set and the fourth data set each comprises degrees-of-freedom (DoF) coordinate data. In some embodiments, the DoF coordinate data corresponds to one or more of: rotational movement of the virtual camera around x-, y-, and z-axes, or translational movement along the x-, y-, and z-axes.

In some embodiments, during updating of the 2D rendering using the fourth data set, the server computing device applies an interpolation routine to the 2D rendering. In some embodiments, applying an interpolation routine to the 2D rendering comprises determining a distance between a data element in the second data set and a corresponding data element in the fourth data set; and generating one or more additional frames for insertion into the 2D rendering to transition smoothly between the first position of the virtual camera and the second position of the virtual camera. In some embodiments, the system comprises a capture device that records the 2D rendering of the 3D virtual environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
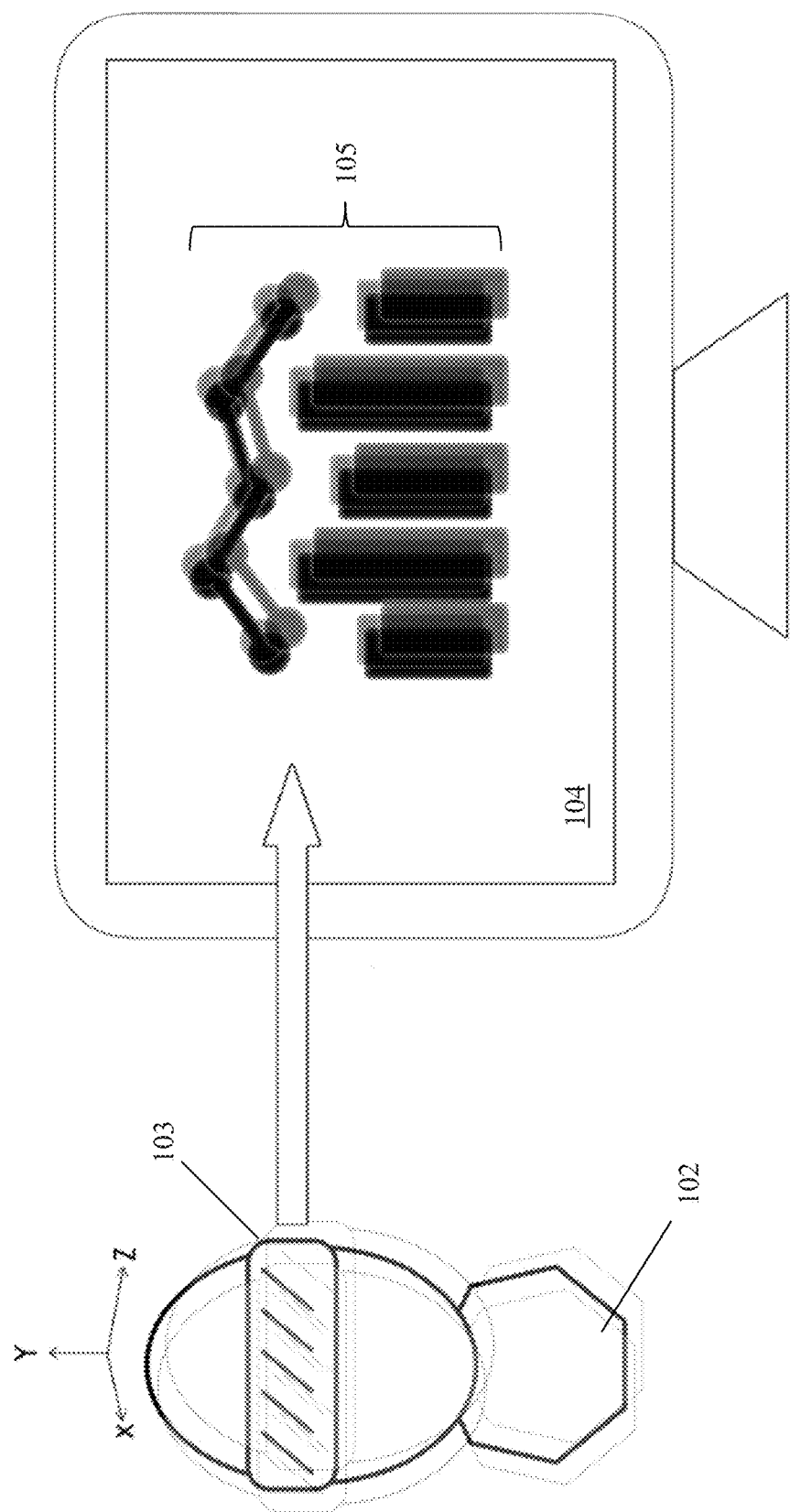
FIG. 1 is a diagram of a system for secondary viewing of an alternative reality application without smoothing.
Figure 2:
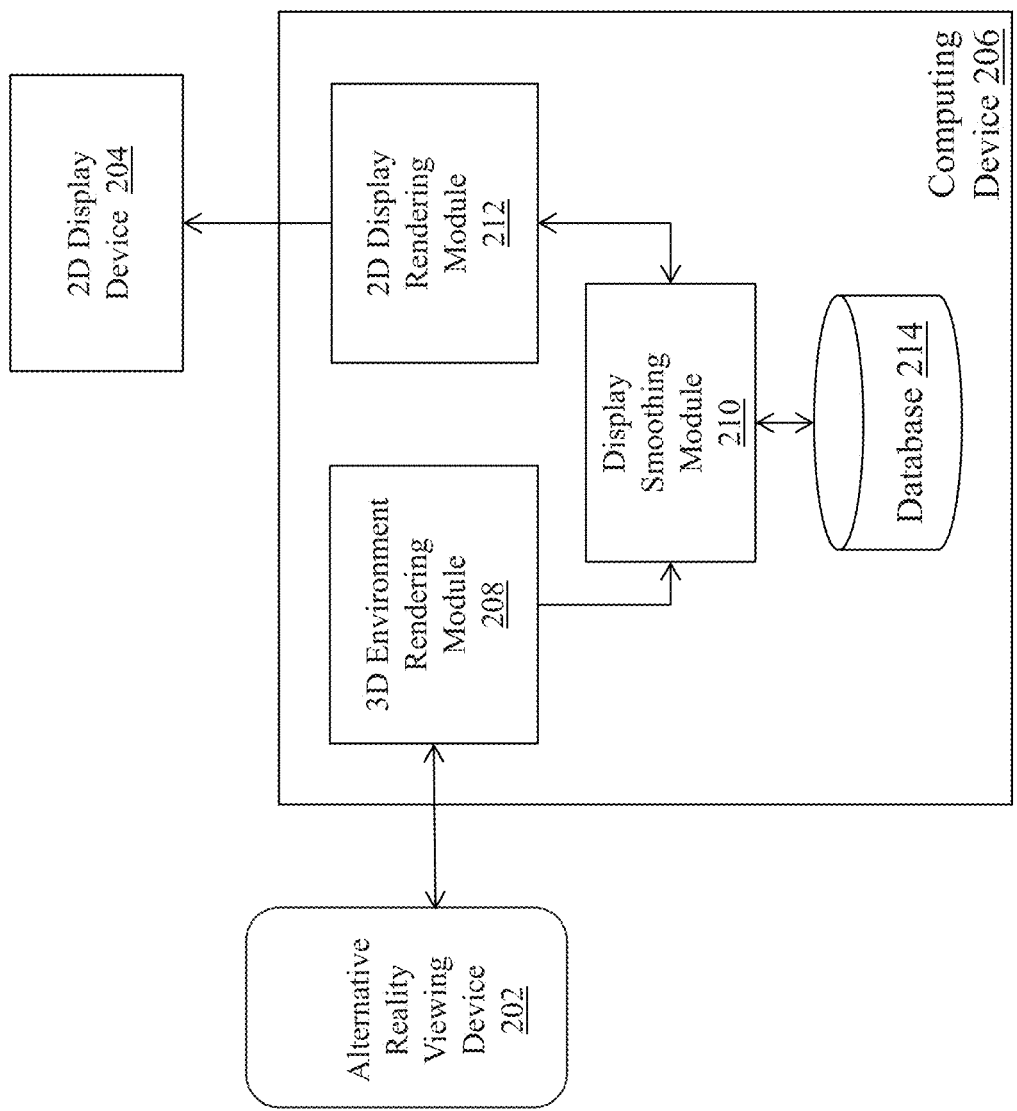
FIG. 2 is a block diagram of a system for intelligent smoothing of three-dimensional (3D) alternative reality applications for secondary two-dimensional (2D) viewing.

FIG. 2 is a block diagram of a system 200 for intelligent smoothing of three-dimensional (3D) alternative reality applications for secondary two-dimensional (2D) viewing. The system 200 includes an alternative reality viewing device 202, a 2D display device 204, and a computing device that includes a 3D environment rendering module 208, a display smoothing module 210, a 2D display rendering module 212, and a database 214.

The alternative reality viewing device 202 comprises an apparatus (e.g., a headset, goggles, glasses, etc.) that enable a user to view a 3D environment (also called a 'raw camera'-such as a virtual reality (VR) environment, an augmented reality (AR) environment, a mixed reality (MR) environment, and/or an extended reality (XR) environment. Exemplary alternative reality viewing devices 202 can include, but are not limited to, the VIVE™ and VIVE Pro™ available from HTC Corporation, the Oculus Rift™ available from Facebook Technologies, LLC, and the Sony Playstation™ VR headset available from Sony Corporation. The alternative reality viewing device 202 connects to the computing device 206 to receive data corresponding to a rendered 3D environment from the computing device 206 for display on the device 202. In some embodiments, the alternative reality viewing device 202 is coupled to the computing device 206 via a physical connection (e.g., one or more cables hardwired using proprietary hardware connections to HDMI, USB and/or Display-ports of the computing device 206). In some embodiments, the alternative reality viewing device 202 is coupled to the computing device 206 via a wireless connection (e.g., WiFi, Bluetooth™, WiGig™ from Intel Corporation). In some embodiments, a communications network (e.g., LAN, WAN) is located between the alternative reality viewing device 202 and the computing device 206.

The display device 204 comprises an apparatus that enables one or more users to view a 2D rendering (i.e., a 'smoothed camera') of the 3D environment (i.e., a 'raw camera') being displayed within the alternative reality viewing module 202. Typically, the 2D rendering and the 3D environment are synchronized so that as the user in the alternative reality viewing device 202 navigates the 3D environment (e.g., by moving his head, etc.), the 2D rendering on the display device 204 is updated to match the 3D environment-so users viewing the display device see what the viewing device 202 user sees. Exemplary display devices 204 include, but are not limited to, 2D flat or curved display devices (e.g., LED monitors, LCD monitors, televisions), 2D projectors, smartphones, and tablets. In some embodiments, the display device 204 is coupled to the computing device 206 via a physical connection (e.g., a cable). In some embodiments, the display device 204 is coupled to the computing device 206 via a wireless connection. In some embodiments, a communications network (e.g., LAN, WAN) is located between the display device 204 and the computing device 206.

The computing device 206 is a device including specialized hardware and/or software modules that execute on a processor and interact with memory modules of the computing device 206, to receive data from other components of the system 200, transmit data to other components of the system 200, and perform functions for intelligent smoothing of 3D alternative reality applications for secondary 2D viewing as described herein. The computing device 206 includes a 3D environment rendering module 208, a display smoothing module 210, and a 2D display rendering module 212 that execute on the processor of the computing device 206. In some embodiments, the modules 208, 210, 212 are specialized sets of computer software instructions programmed onto one or more dedicated processors in the computing device 206 and can include specifically-designated memory locations and/or registers for executing the specialized computer software instructions.

Although the computing modules 208, 210, 212 are shown in FIG. 2 as executing within the same computing device 206, in some embodiments the functionality of the modules 208, 210, 212 can be distributed among a plurality of computing devices. As shown in FIG. 2, the computing device 206 enables the modules 208, 210, 212 to communicate in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the invention described herein. For example, the computing device 206 can be a desktop or laptop computer coupled to the alternative reality viewing device 202 and/or the display device 204 via a physical connection. In another example, the computing device 206 can be a server computing device coupled to the alternative reality viewing device 202 and/or the display device 204 via a logical network connection. The exemplary functionality of the modules 208, 210, 212 is described in detail below.

The database 214 is a computing module of the computing device 206 that is configured to receive, generate, and store specific segments of data relating to the process of intelligent smoothing of 3D alternative reality applications for secondary 2D viewing as described herein. In some embodiments (as shown in FIG. 2), all or a portion of the database 214 can be integrated with the computing device 206. In some embodiments, the database 214 can be located on a separate computing device or devices. The database 214 can comprise one or more databases configured to store portions of data used by the other components of the system 200, as will be described in greater detail below. In some embodiments, the database 214 functions as a data repository to store computing files in memory and/or on disk. For example, the database 214 can be remote accessed via a LAN/WAN, or the database 214 can be internal to the computing device 206.

Figure 3:
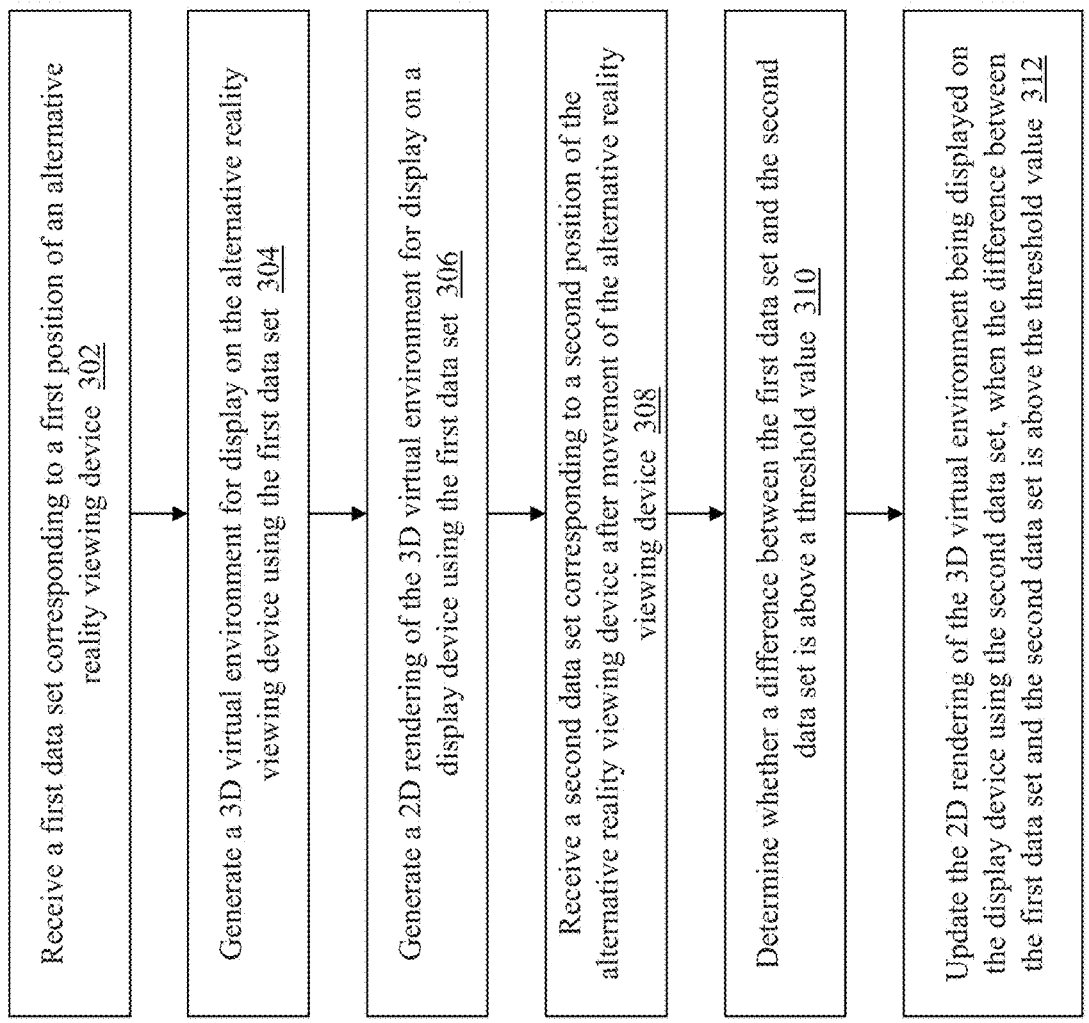
FIG. 3 is a flow diagram of a computerized method of intelligent smoothing of three-dimensional (3D) alternative reality applications for secondary two-dimensional (2D) viewing.

FIG. 3 is a flow diagram of a computerized method 200 of computerized method of intelligent smoothing of three-dimensional (3D) alternative reality applications for secondary two-dimensional (2D) viewing, using the system 200 of FIG. 2. The computing device 206 receives (302) a first data set corresponding to a first position of the alternative reality viewing device 202. For example, the computing device 206 can capture three and/or six degrees-of-freedom (DoF) data from the alternative reality viewing device 202. Generally, DoF data corresponds to rotational movement around the x-, y-, and z-axes (also called pitch, yaw, and roll), as well as translational movement along the x-, y-, and z-axes (i.e., moving forward or backward, moving left or right, moving up or down). In some embodiments, the alternative reality viewing device 202 may be 3DoF-meaning that the device 202 can track rotational movement only. In some embodiments, the alternative reality viewing device 202 may be 6DoF-meaning that the device 202 can track rotational movement and translational movement. While the example embodiment described herein relates to a 3DoF viewing device 202, it should be appreciated that the techniques can similarly be applied to a 6DoF viewing device.

Figure 4:
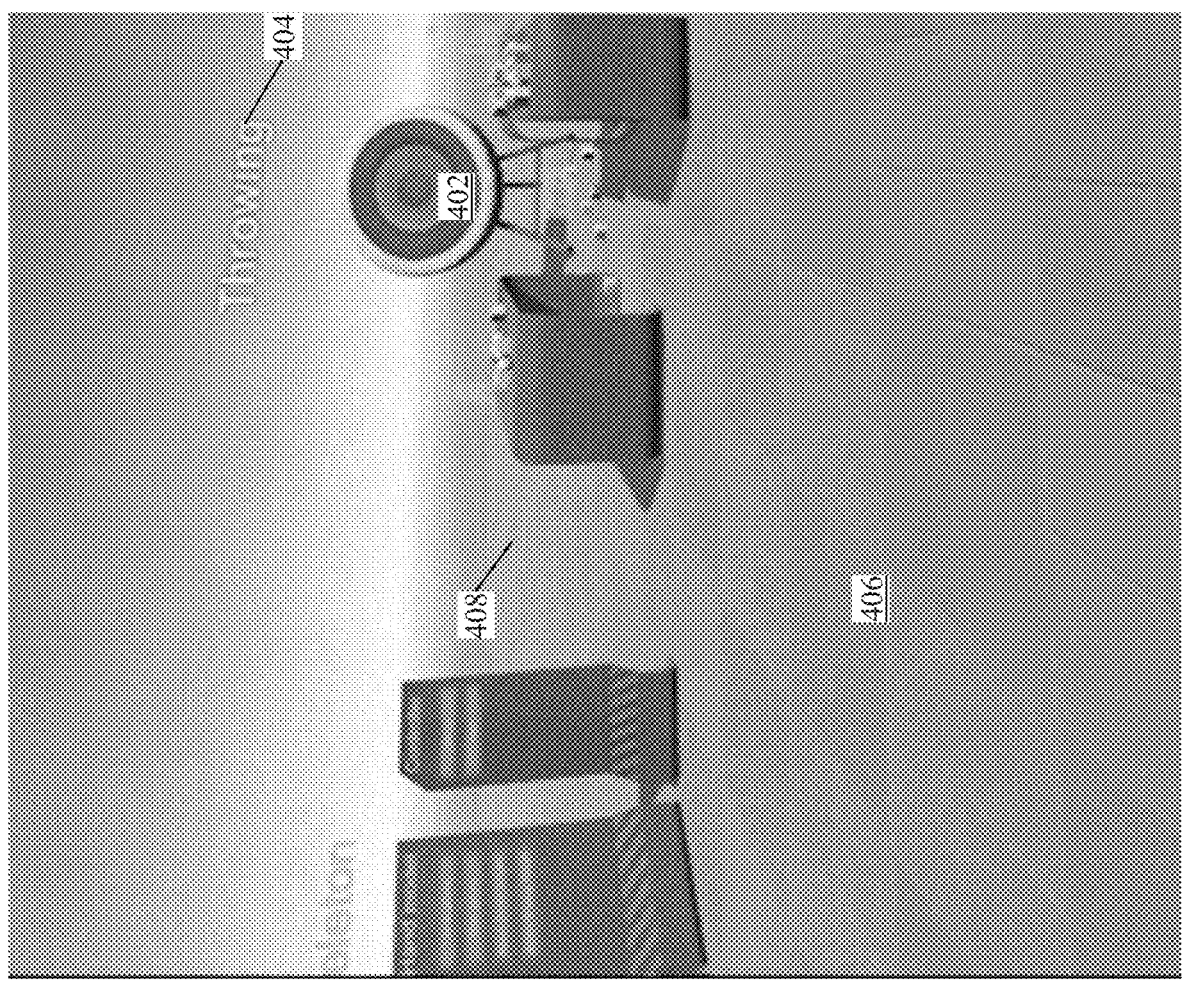
FIG. 4 is a diagram of an exemplary 3D virtual environment generated by the computing device.

The computing device 206 receives x-, y-, and z-coordinate data from the alternative reality viewing device 202 that corresponds to the current position of the device 202. Using the received coordinate data, the computing device 206 generates (304) a 3D virtual environment for display on the alternative reality viewing device 202 using the x-, y-, and z-coordinate data for the current position of the device 202. FIG. 4 is a diagram of an exemplary 3D virtual environment generated by the computing device 206. As shown in FIG. 4, the environment comprises one or more 3D objects 402 (e.g., a target), text 404, a plane/surface 406 (e.g., floor), a horizon line 408, etc. The 3D virtual environment is rendered using the coordinate data received from the alternative reality viewing device to set the appearance, distance, perspective, etc. of the elements 402, 404, 406, 408 in the 3D virtual environment.

Figure 5:
FIG. 5 is a diagram of an exemplary 2D rendering of the 3D virtual environment as generated by the computing device.

The computing device 206 also generates (306) a 2D rendering of the 3D virtual environment for display on a display device 204 (e.g., a 2D screen) using the x-, y-, and z-coordinate data for the current position of the device 204. FIG. 5 is a diagram of an exemplary 2D rendering of the 3D virtual environment as generated by the computing device 206. As shown in FIG. 5, the display device 204 provides the 2D rendering, e.g., to an audience of viewers. In some embodiments, the computing device 206 generates a plurality of individual output streams or signals for distribution to multiple different display devices. For example, the computing device 206 can be coupled to a variety of different display devices and can be configured to provide a separate output stream comprising a 2D rendering of the virtual environment to each of the display devices.

Next, the user wearing the alternative reality viewing device 202 may move his or her head to, e.g., navigate through the 3D virtual environment and/or view different aspects of the environment. As the user moves his head, the computing device 206 receives (308) a second data set corresponding to the position of the viewing device 202 at certain points during the movement of the viewing device 202 and/or after movement of the viewing device 202 has ended. In one example, the second data set comprises the x-, y-, and z-coordinate data for the viewing device as described above. It should be appreciated that the computing device 206 can receive the second data set at any time during movement of the viewing device 202.

The computing device 206 determines (310) whether a difference between the first data set (e.g., corresponding to the position of the viewing device 202 prior to the movement) and the second data set (e.g., corresponding to the position of the viewing device during or after the movement) is above a threshold value. The threshold value can represent a minimum movement amount that should be reflected in the 2D rendering on the display device 204. In some embodiments, the threshold value comprises a plurality of values—each value associated with one of the DoF values/axes as described above. For example, it may be desirable to incorporate different DoF threshold values based upon the particular VR/AR/MR/XR software application being displayed on the display device 204—i.e., the 2D rendering of a video game that requires rapid turning and movement by the user in the 3D environment may benefit from smaller threshold values for one or more of the DoF axes (thereby producing a more realistic representation of the gameplay), while the 2D rendering of a data-display application that does not have very much movement by the user may benefit from large threshold values (to generate a smoother viewing experience). It should be appreciated that the computing device 206 can determine a difference by comparing one or more of the individual DoF position (i.e., coordinate) values in the first data set and the second data set and then evaluating the difference against the threshold value for that DoF position, or by aggregating the differences between each of the respective DoF position values into an overall difference—and then comparing the overall difference to a threshold value.

Once the computing device 206 has determined that the difference is above the corresponding threshold value, the computing device 206 updates (312) the 2D rendering of the 3D virtual environment being displayed on the display device 204 using the second data set (that is, the position data of the viewing device 202 during/after movement). Upon updating the 2D rendering, the viewers of the display device 204 see a representation of the 3D virtual environment that corresponds to the viewpoint of the user of the alternative reality viewing device 202. It should be appreciated that, in some embodiments, the computing device 206 can apply an interpolation routine during updating of the 2D rendering to produce a smooth, seamless transition. For example, the computing device 206 can determine the distance between the first position and the second position (on each of one or more of the DoF axes) and generate additional frames for the 2D rendering to transition smoothly between the two positions.

It should be appreciated that, when the difference(s) between the first data set and the second data set fall below the appropriate threshold value, the computing device 206 can just ignore the movement and not update the 2D rendering on display device 204.

Exemplary pseudocode for determining the difference and updating the 2D rendering of the 3D virtual environment is provided below:

```
targetAngle = smoothedCamera.Angle;
// Get the absolute difference of the angle on just the X
// axis between the two cameras
xDifference = Absolute(smoothedCamera.Angle.x -
rawCamera.Angle.x);
// ignore any change that is less than the configured buffer
if(xDifference > minimumXChangeAllowed){
// angle will only be multiples of minimumXChangeAllowed
    targetAngle.x = GetRoundedDownAngle(rawCamera.Angle.x)
}
//Repeat for the Y axis
yDifference = Absolute(smoothedCamera.Angle.y -
rawCamera.Angle.y);
if(yDifference > minimumYChangeAllowed){
    targetAngle.y = GetRoundedDownAngle(rawCamera.Angle.y)
}
//Repeat for the Z axis
zDifference = Absolute(smoothedCamera.Angle.z -
rawCamera.Angle.z);
if(zDifference > minimumZChangeAllowed){
    targetAngle.z = GetRoundedDownAngle(rawCamera.Angle.z)
}
if(targetAngle != smoothedCamera.Angle){
    //rotate the camera towards the new angle at the given
    speed
    smoothedCamera.rotateTowards(targetAngle, speed)
}
```

The advantageous smoothing techniques described herein can benefit a wide array of different applications and use cases. In one example, the techniques can be applied in the context of a demonstration of VR/AR/MR/XR software to viewers that are not wearing an alternative reality viewing device (such as to a roomful of conference attendees). It may be impractical for all members of a viewing audience to wear their own 3D viewing device and it would be difficult to synchronize the display of the 3D virtual environment in the viewing devices so that the presenter can walk through the capabilities of the demonstration software. Therefore, the viewers can simply watch the presentation of the 3D virtual environment on a 2D screen or monitor, while still being able to enjoy the demonstration without the disconcerting jitter that is described above.

In another example, the techniques can be applied in the context of an online streaming session—where multiple remote viewers are watching a user wearing a VR headset interact with a 3D virtual environment (such as a Twitch™ broadcast). The smoothed 2D rendering of the 3D virtual environment can be broadcast to a plurality of remote viewers, thereby producing an improved audience experience. It should be appreciated that, in some embodiments, the remote viewers can individually configure the threshold values for his or her personal stream of the 2D rendering (either on a local device or browser, or by sending preferred threshold values to a server computing device that is broadcasting the stream) to achieve an individualized experience—as some viewers may have a higher tolerance for jitter than others.

As mentioned above, in some embodiments the computing device 206 generates a plurality of individual output streams or signals for distribution to multiple different display devices. For example, the computing device 206 can be coupled to a variety of different display devices and can be configured to provide a separate output stream comprising a 2D rendering of the virtual environment to each of the display devices. For example, each display device can be associated with a different user, such as an attendee of a presentation and/or a remote user viewing the output stream on a personal computing device. As the computing device 206 generates the output stream comprising the 2D rendering ('smoothed camera') for each of the display devices, the computing device 206 can adjust the viewing perspective of the smoothed camera for each output stream in order to provide a unique experience for the different users. In one example as described above, the computing device 206 generates the smoothed camera view at a viewpoint corresponding to the same view of the 3D virtual environment that is being rendered in the alternative reality viewing device 202, so that the other user(s) can experience the virtual environment from the same perspective as the user wearing the alternative reality viewing device 202.

In another example, the computing device 206 generates the smoothed camera view at a viewpoint that is different from the view of the 3D virtual environment being rendered in the alternative reality viewing device 202. In this example, the computing device 206 beneficially enables users viewing the 2D rendering to adjust their view of the environment to be different than the view dictated by the position and orientation of the alternative reality viewing device 202—enabling independent exploration of the virtual environment while the user wearing the device 202 can continue with the intended application, e.g., a demonstration of AR/VR software, as planned.

In one embodiment, the computing device 206 receives input from a remote computing device that is receiving the output stream of the 2D rendering from the computing device 206 for display to an observing user. The input provides instructions to the computing device 206 to adjust the location, orientation and/or viewpoint (in any of 6DOF) of the smoothed camera within the 3D environment so that a viewpoint of the 2D rendering is provided using the adjustment parameters. For example, the user of the remote computing device can interact with a user interface (UI) generated as part of the 2D rendering and/or use input device hardware coupled to the remote computing device (such as touchscreens, haptic devices, joysticks, voice input, etc.) to provide the input instructions. It should be appreciated that the input instructions can be provided either before the output stream of the 2D rendering is generated by the computing device 206 or at any time during transmission of the output stream to the remote computing device.

Upon receiving the adjustment parameters, the computing device 206 generates and/or updates the 2D rendering so that the viewpoint of the 3D virtual environment in the rendering is now provided from the adjusted camera position. In one example, the computing device 206 can utilize the adjustment parameters to move the viewpoint of the 2D rendering a certain defined distance behind the viewpoint of the 3D virtual environment as seen by the user in the alternative reality viewing device 202. In addition, the computing device 206 can also generate a virtual avatar of the user wearing the alternative reality viewing device 202 in the 2D rendering, so that the user at the remote computing device can see the device 202 user's position, head movements, etc. within the environment but without also transferring the unsteady head movement and tracking of the device 202 user. In some embodiments, the computing device 206 can establish a movement arc behind the device 202 user's head so that the smoothed camera displayed in the 2D rendering can track along the arc using the same smoothing algorithms as described above.

Figure 6:
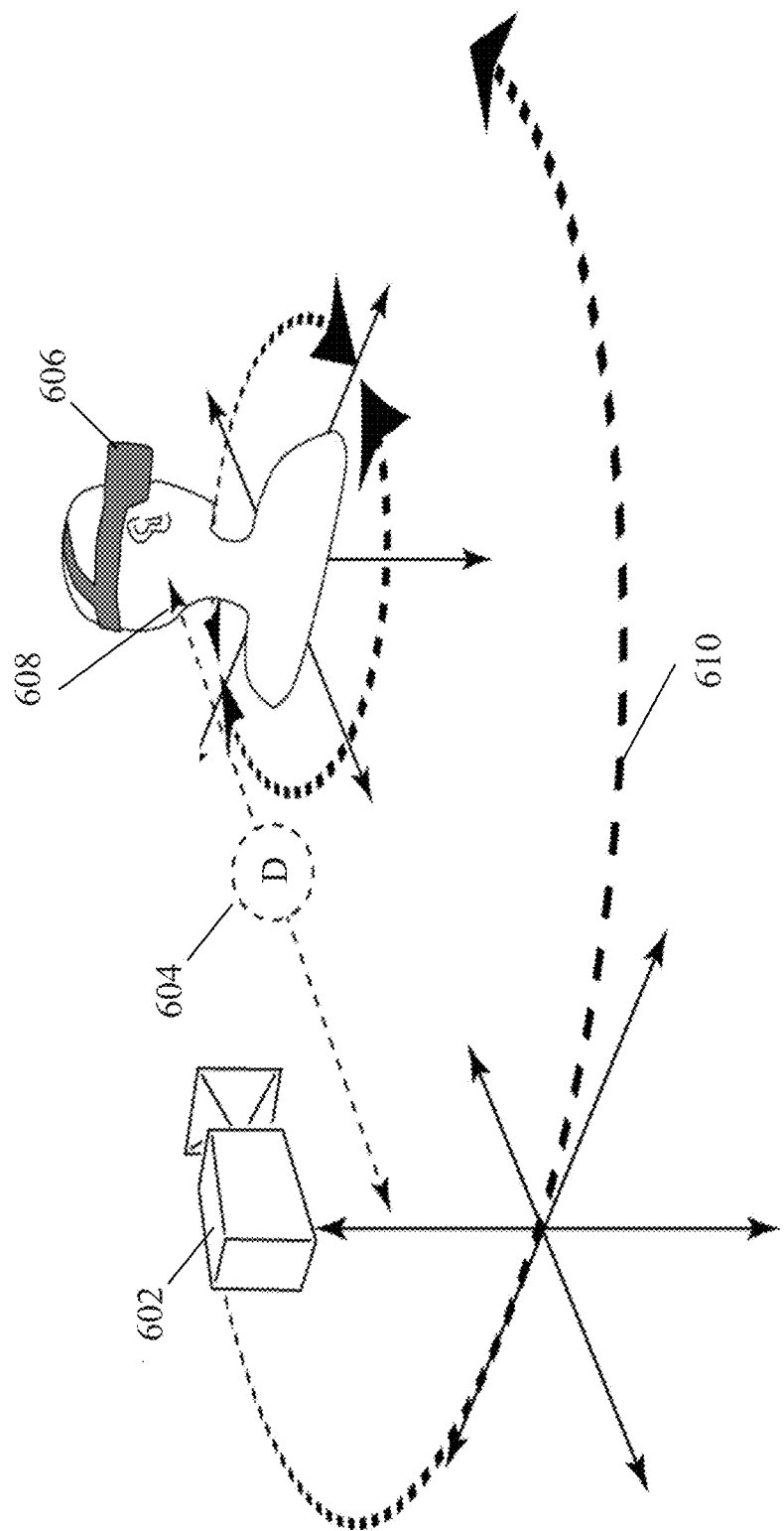
FIG. 6 is a diagram of an arrangement for intelligent smoothing of three-dimensional (3D) alternative reality applications for secondary two-dimensional (2D) viewing showing a smoothed camera at a different viewpoint than a raw camera.

FIG. 6 is a diagram of an arrangement 600 for intelligent smoothing of three-dimensional (3D) alternative reality applications for secondary two-dimensional (2D) viewing showing a smoothed camera at a different viewpoint than a raw camera, using the system 200 of FIG. 2. As shown in FIG. 6, the viewpoint of the smoothed camera 602 (i.e., that represents the viewpoint of the 3D virtual environment used for the 2D rendering) is located at a distance 604 behind the viewpoint of the raw camera 606 (i.e., that represents the viewpoint of the 3D virtual environment by the user wearing the alternative reality viewing device 202). The computing device 206 generates a virtual avatar 608 at the location of the user wearing the alternative reality viewing device 202 in the 3D environment, for display as part of the 2D rendering. As the user wearing the viewing device 202 moves his or her head, viewing direction, etc., the computing device 206 updates the virtual avatar 608 based upon that movement—while also smoothing the movements to eliminate the jitter, unsteadiness, and other undesirable movements using the techniques described above.

In addition, the user viewing the 2D rendering via smoothed camera 602 can move the smoothed camera within the 3D environment independently from the raw camera 606 of the alternative reality viewing device 202—such as along arc 610 and/or within any of 6DOF in the 3D environment. This advantageously provides a highly interactive and customizable 2D rendering for viewers while also reducing the unpleasant side effects associated with viewing a virtual environment presentation.

A further improvement that can be provided by the systems and methods described herein is the inclusion of a second smoothed camera (apart from the smoothed camera that is used to generate the 2D rendering) for use in capturing video of the 3D virtual environment. As can be appreciated, it may be desirable to capture and share a recording taken from within the headset for, e.g., demonstrations, quality assurance and/or project sharing. However, as noted above, existing systems produce recordings that can be very jittery due to incremental head movements by the wearer of the headset (e.g., the user in the headset moves their head slightly but the user compensates for this movement by keeping their eyes focused on what they are looking at). The user in the headset is unaware of this compensation and even unable to keep their head still enough to produce a smooth video.

Therefore, the computing device 206 of system 200 can generate a second smoothed camera (e.g. a virtual camera) with a 2D rendering of the 3D virtual environment that compensates for the movement of the device 202 wearer and provides the wearer with the ability to record the 3D environment using the second smoothed camera. In some embodiments, the second smoothed camera is positioned within the 3D virtual environment directly in front of the wearer's eye position. The second smoothed camera is not visible to the wearer of the headset and also does not update its position or orientation, thereby not causing the computing device 206 to generate a 2D rendering that is jittery because it is moving with every small movement of the wearer. Instead, the 2D rendering generated by the second smoothed camera is not affected by movement of the wearer of the headset and can produce a steady representation of the 3D environment to secondary viewers.

Further, the above techniques can take advantage of machine learning algorithms to automatically adjust the smoothing applied to particular 2D renderings based upon, e.g., the viewer of the 2D rendering and/or the 3D software application being presented in the 2D rendering. For example, the computing device 206 can include a machine learning module that captures data and metadata from the display of a 2D rendering to one or more users (including, e.g., the type of 3D application, the type of display device, the threshold value(s), user identification parameters, user feedback (like/dislike the 2D rendering, amount of time spent watching, etc.) to classify the 2D rendering, and then the computing device 206 can utilize the captured data to automatically adjust threshold value(s) for subsequent 2D renderings that may share similar characteristics to the prior 2D renderings. In this way, the computing device 206 can predict optimal or preferred threshold value(s) for a 2D rendering that has not yet been displayed on a display device 204, which can reduce the amount of time required to generate a smoothed 2D rendering that is enjoyable to a particular viewer type or to a variety of viewer types.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for intelligent smoothing of three-dimensional (3D) alternative reality applications for secondary two-dimensional (2D) viewing, the system comprising:
    an alternative reality viewing device that displays a 3D virtual environment to a user of the alternative reality viewing device;
    a display device that displays a 2D rendering of the 3D virtual environment to one or more other users;
    a computing device coupled to the alternative reality viewing device and the display device, the computing device comprising a memory to store computer-executable instructions and a processor that executes the computer-executable instructions to:
       receive a first data set corresponding to a first position of the alternative reality viewing device;
       generate a second data set corresponding to a first position of a virtual camera in the 3D virtual environment that is different from the first position of the alternative reality viewing device;
       generate the 3D virtual environment for display on the alternative reality viewing device using the first data set;
       generate the 2D rendering of the 3D virtual environment for display on the display device using the second data set, the 2D rendering comprising a virtual avatar representing the user of the alternative reality viewing device in the 3D virtual environment;
       receive a third data set corresponding to a second position of the alternative reality viewing device after movement of the alternative reality viewing device;
       determine whether a difference between the first data set and the third data set is above a threshold value; and
       update a characteristic of the virtual avatar in the 2D rendering of the 3D virtual environment being displayed on the display device using the third data set, when the difference between the first data set and the third data set is above the threshold value.

2. The system of claim 1, wherein the alternative reality viewing device is a virtual reality (VR) headset.

3. The system of claim 1, wherein the first data set and the third data set each comprises degrees-of-freedom (DoF) coordinate data.

4. The system of claim 3, wherein the DoF coordinate data corresponds to one or more of: rotational movement of the alternative reality viewing device around x-, y-, and z-axes, or translational movement along the x-, y-, and z-axes.

5. The system of claim 4, wherein determining whether a difference between the first data set and the third data set is above a threshold value comprises:
    determining a difference between one or more DoF coordinate values in the first data set and one or more corresponding DoF coordinate values in the third data set; and
    comparing the difference to a threshold value for the corresponding DoF coordinate.

6. The system of claim 4, wherein determining whether a difference between the first data set and the third data set is above a threshold value comprises:
    determining a difference between each of two or more DoF coordinate values in the first data set and each of two or more corresponding DoF coordinate values in the third data set;
    aggregating the differences between each of the respective two or more DoF coordinate values into an overall difference; and
    comparing the overall difference to a threshold value.

7. The system of claim 1, wherein the computing device:
    receives a fourth data set corresponding to a second position of the virtual camera; and
    updates the 2D rendering of the 3D virtual environment being displayed on the display device using the fourth data set.

8. The system of claim 7, wherein the second data set and the fourth data set each comprises degrees-of-freedom (DoF) coordinate data.

9. The system of claim 8, wherein the DoF coordinate data corresponds to one or more of: rotational movement of the virtual camera around x-, y-, and z-axes, or translational movement along the x-, y-, and z-axes.

10. The system of claim 7, wherein during updating of the 2D rendering using the fourth data set, the server computing device applies an interpolation routine to the 2D rendering.

11. The system of claim 10, wherein applying an interpolation routine to the 2D rendering comprises:
    determining a distance between a data element in the second data set and a corresponding data element in the fourth data set; and
    generating one or more additional frames for insertion into the 2D rendering to transition smoothly between the first position of the virtual camera and the second position of the virtual camera.

12. The system of claim 1, further comprising a capture device that records the 2D rendering of the 3D virtual environment.

13. A computerized method of intelligent smoothing of three-dimensional (3D) alternative reality applications for secondary two-dimensional (2D) viewing, the method comprising:
    receiving, by a computing device, from an alternative reality viewing device, a first data set corresponding to a first position of the alternative reality viewing device;
    generating, by the computing device, a second data set corresponding to a first position of a virtual camera in the 3D virtual environment that is different from the first position of the alternative reality viewing device;
    generating, by the computing device, the 3D virtual environment for display on the alternative reality viewing device using the first data set;
    generating, by the computing device, the 2D rendering of the 3D virtual environment for display on the display device using the second data set, the 2D rendering comprising a virtual avatar representing the user of the alternative reality viewing device in the 3D virtual environment;
    receiving, by the computing device, from the alternative reality viewing device, a third data set corresponding to a second position of the alternative reality viewing device after movement of the alternative reality viewing device;

determining, by the computing device, whether a difference between the first data set and the third data set is above a threshold value; and updating, by the computing device, a characteristic of the virtual avatar in the 2D rendering of the 3D virtual environment being displayed on the display device using the third data set, when the difference between the first data set and the third data set is above the threshold value.

14. The method of claim 13, wherein the alternative reality viewing device is a virtual reality (VR) headset.

15. The method of claim 13, wherein the first data set and the third data set each comprises degrees-of-freedom (DoF) coordinate data.

16. The method of claim 15, wherein the DoF coordinate data corresponds to one or more of: rotational movement of the alternative reality viewing device around x-, y-, and z-axes, or translational movement along the x-, y-, and z-axes.

17. The method of claim 16, wherein determining whether a difference between the first data set and the third data set is above a threshold value comprises:

determining a difference between one or more DoF coordinate values in the first data set and one or more corresponding DoF coordinate values in the third data set; and comparing the difference to a threshold value for the corresponding DoF coordinate.

18. The method of claim 17, wherein determining whether a difference between the first data set and the third data set is above a threshold value comprises:

determining a difference between each of two or more DoF coordinate values in the first data set and each of two or more corresponding DoF coordinate values in the third data set;

aggregating the differences between each of the respective two or more DoF coordinate values into an overall difference; and comparing the overall difference to a threshold value.

19. The method of claim 13, further comprising:

receiving, by the computing device, a fourth data set corresponding to a second position of the virtual camera; and updating, by the computing device, the 2D rendering of the 3D virtual environment being displayed on the display device using the fourth data set.

20. The method of claim 19, wherein the second data set and the fourth data set each comprises degrees-of-freedom (DoF) coordinate data.

21. The method of claim 20, wherein the DoF coordinate data corresponds to one or more of: rotational movement of the virtual camera around x-, y-, and z-axes, or translational movement along the x-, y-, and z-axes.

22. The method of claim 19, wherein during updating of the 2D rendering using the fourth data set, the server computing device applies an interpolation routine to the 2D rendering.

23. The method of claim 22, wherein applying an interpolation routine to the 2D rendering comprises:

determining a distance between a data element in the second data set and a corresponding data element in the fourth data set; and generating one or more additional frames for insertion into the 2D rendering to transition smoothly between the first position of the virtual camera and the second position of the virtual camera.

24. The method of claim 13, further comprising recording, by a capture device, the 2D rendering of the 3D virtual environment.

* * * * *